3,298,979
GRAFT COPOLYMERS COMPRISING ACRYLO-
NITRILE AND CELLULOSE DERIVATIVES
Hugh J. Hagemeyer, Jr., Alden E. Blood, and Marvin B.
Edwards, Longview, Tex., assignors to Eastman Kodak
Company, Rochester, N.Y., a corporation of New
Jersey
No Drawing. Filed Aug. 9, 1963, Ser. No. 301,185
8 Claims. (Cl. 260—17)

This invention relates to resinous graft copolymers of monomeric acrylonitrile and certain 2,2-dimethylalkyl ethenoid monomers with hydroxyl-containing cellulose derivatives that are characterized by high thermal and chemical stability, and to a process for preparing these graft copolymers.

It is known that acrylonitrile polymers of improved dyeability are obtained by graft copolymerizing a mixture of acrylonitrile monomer and various other well-known polymerizable, monoethylenically unsaturated monomers with hydroxyl-containing cellulose esters and ethers. While these products have found valuable applications where dye affinity is important, many of the more desirable species as to physical properties have shown poor resistance to thermal, oxidative and hydrolytic degradation. This has seriously limited their uses. For example, they have not proven completely satisfactory for the fiber and textile art where a high degree of stability is an especially important requirement.

We have now found that when a monomeric mixture of acrylonitrile and a minor proportion of certain other polymerizable, monoethylenically unsaturated compounds containing at least one 2,2-dimethylalkyl substituent is copolymerized with a hydroxyl-containing cellulose ester or ether, in certain proportions, the resulting graft copolymers show not only good dyeability, but in addition are outstanding in their resistance to thermal, oxidative and hydrolytic degradation. Fibers, films and molded articles prepared therefrom, we have found, exhibit excellent physical properties and especially good stability. For example, the fibers, when drafted, are free from any segmentation defects, and are strong and elastic, high melting, low shrinking, essentially colorless and lustrous, readily dyeable to fast deep colors by acetate and basic type dyes, and furthermore, are very resistant to weathering alkaline solutions, soaps and scours, as well as to attack by the common organic and dry cleaning solvents.

It is, accordingly, an object of the invention to provide a new class of graft copolymers consisting of (1) acrylonitrile monomer and another ethenoid monomer, i.e. comonomer, containing a 2,2-dimethylalkyl group substituent and (2) a hydroxyl-containing cellulose ester or ether that are eminently suitable for the manufacture of fibers, films and molded articles of good physical properties and outstanding stability to weathering, heat, oxidation and hydrolysis. Another object is to provide stable, homogeneous and readily spinnable and coatable solutions of the new class of graft copolymers in volatile organic solvents. Still another object is to provide fibers having the aforementioned advantageous physical and chemical characteristics. A further object is to provide processes for preparing these new graft copolymers and shaped articles therefrom. Other objects will become apparent hereinafter.

In accordance with the invention, we prepare our new class of graft copolymers by copolymerizing a mixture of (1) from 50–95% by weight, and preferably from 70–90%, of monomeric material consisting of acrylonitrile and at least one other ethenoid comonomer such as a vinyl or isopropenyl ester of a 2,2-dimethylalkanoic acid of 5–16 carbon atoms, a 2,2-dimethylalkyl acrylate or methacrylate, a di-2,2-dimethylalkyl maleate, fumarate, itaconate or citraconate, an N-2,2-dimethylalkyl acrylamide or methacrylamide, a di-N-2,2-dimethylalkyl maleamide, fumaramide, itaconamide or citraconamide, a 2,2-dimethylalkyl vinyl ether or ketone, wherein in each instance the said 2,2-dimethylalkyl group contains from 5–16 carbon atoms, and (2) from 50–5% by weight, and preferably from 30–10%, of a cellulose derivative such as a cellulose ester or ether, or mixed esters or ethers, having from 10–70% and desirably from 20–50% of the hydroxyl groups of the cellulose in free form and having the remainder of the hydroxyl groups replaced by radicals from the group consisting of alkyl groups of from 1–4 carbon atoms, e.g. methyl, ethyl, propyl, isopropyl, butyl, etc. groups, carboxyalkyl groups of from 2–5 carbon atoms, e.g. carboxymethyl, carboxyethyl, carboxypropyl, etc. groups, and acyl groups of from 2–5 carbon atoms, e.g. acetyl, propionyl, butyryl, etc. groups, until the monomeric material has combined with the cellulose derivative to form the graft copolymers of the invention. Thus, typical cellulose derivatives include but are not limited to such compounds as methyl cellulose, ethyl cellulose, propyl cellulose, butyl cellulose, carboxymethyl cellulose, carboxyethyl cellulose, methyl cellulose acetate, ethyl cellulose acetate, ethyl cellulose propionate, methyl cellulose propionate, cellulose acetate, cellulose diacetate, cellulose triacetate, cellulose acetate-propionate, cellulose butyrate, cellulose isobutyrate, cellulose acetate-butyrate, and the like. Specially activated cellulose derivatives such as partially hydrolyzed cellulose ethers maintained in swollen condition can be used, if desired, although activation in this way is not necessary for good results. If desired, the cellulose derivative can be allowed to react in aqueous solution with acrylonitrile either before or during polymerization to form partially cyanoethylated cellulose derivatives. Thus, for example, cyanoethyl cellulose, ethyl cyanoethyl cellulose, and the like, are suitably employed in the above process.

Typical polymerizable comonomers coming within the above definitions include vinyl 2,2-dimethylpropionate, vinyl 2,2-dimethylbutyrate, vinyl 2,2-dimethylhexanoate, vinyl 2,2-dimethyldodecanoate, vinyl 2,2-dimethyltetradecanoate, etc., 2,2-dimethylpropyl acrylate, 2,2-dimethylbutyl acrylate, 2,2-dimethylhexyl acrylate, 2,2-dimethyldodecyl acrylate, 2,2-dimethyltetradecyl acrylate, etc. and corresponding methacrylate compounds, di-2,2-dimethylpropyl maleate, di-2,2-dimethylbutyl maleate, di-2,2-dimethylhexyl maleate, di-2,2-dimethyldodecyl maleate, etc. and corresponding fumarates, itaconates and citraconates, N-2,2-dimethylpropyl acrylamide, N - 2,2 - dimethylbutyl acrylamide, N-2,2-dimethylhexyl acrylamide, etc. and corresponding methacrylamides, and di-N-2,2-dimethylpropyl maleamide, di-N-2,2-dimethylbutyl maleamide, di-N-2,2-dimethylhexyl maleamide, etc. and corresponding fumaramides, itaconamides and citraconamides, 2,2-dimethylpropyl vinyl ether, 2,2-dimethylbutyl vinyl ether, 2,2-dimethylbutyl vinyl ether, 2,2-dimethyldodecyl vinyl ether, 2,2-dimethyltetradecyl vinyl ether, and corresponding 2,2-dimethylalkyl vinyl ketones.

The vinyl 2,2-dimethylalkyl alkanoates comonomers can be prepared by the addition of acetylene to the appropriate 2,2-dimethylalkanoic acid, in the presence of a catalyst such as mercuric sulfate or mercuric phosphate, at elevated temperatures and pressures. The ester products can be isolated by extraction and distillation under reduced pressure.

The 2,2-dimethylalkyl acrylate and methacrylate comonomers can be prepared, for example, by the alcoholysis process comprising an atmospheric reaction between methyl acrylate or methyl methacrylate and the appropriate 2,2-dimethylalkyl alcohols, employing tetraisopropyl titanate as a catalyst. The low boiling by product methanol is removed in azeotrope form through a fractionating column. The base material is then flashed through a short head and distilled to recover the desired ester product. Although methyl acrylate and methyl methacrylate are the preferred intermediates, it will be understood that any other lower alkyl acrylate or methacrylate can also be used efficaciously in the process, for example, ethyl, propyl, isopropyl, butyl, etc. acrylates and methacrylates. For further details, reference may be had to the descriptions in our copending applications Serial No. 301,171, now Patent 3,262,994, and Serial No. 301,195, now Patent 3,262,993, filed of even date herewith. The corresponding maleates, fumarates, itaconates and citraconates can be prepared by the above general process by alcoholysis of the dimethylmaleates, fumarates, itaconates and citraconates.

The N-2,2-dimethylalkyl acrylamides and methacrylamides comonomers can be prepared by the reaction of methyl acrylate or methyl methacrylate with the appropriate 2,2-dimethyl-alkylamines, by the general process described in Erickson, United States Patent No. 2,451,-436, dated October 12, 1948. Reference can be had for copending application of Hagemeyer, Blood and Heller, Serial No. 308,339, now Patent 3,254,138, filed of even date herewith, for a more detailed description of the preparation of the N-2,2-dimethylalkyl acrylamides and methacrylamides, and corresponding di-N-2,2-dimethylalkyl maleamides, fumaramides, itaconamides and citraconamides.

The graft copolymerizations of the invention can be carried out by any of the well-known polymerization techniques. The reactions are accelerated by heat, by actinic light such as ultraviolet light and by the use of known polymerization catalysts such as the peroxides, e.g. benzoyl peroxide, acetyl peroxide, lauryl peroxide, triacetone peroxide, urea peroxide, t-butyl hydroperoxide, alkyl percarbonates, etc., hydrogen peroxide, alkali metal persulfates, e.g. sodium or potassium persulfates, ammonium persulfate, alkali metal perborates, and the like. Other useful polymerization catalysts are boron trifluoride and azo-bis-nitriles. Mixtures of catalysts can be employed. The quantity of catalyst can be varied depending on the reaction medium and other conditions, but ordinarily from about 0.01 to 2%, based on the weight of materials to be polymerized, is efficacious.

Advantageously, the polymerizations are carried out under nitrogen or other inert gas, as dispersions in aqueous medium, although other reaction media such as organic solvents can also be used. For example hydrocarbons such as benzene, n-heptane, petroleum ether, acetone, methanol, ethanol, isopropanol, and the like, and more especially aqueous solutions of the water-soluble solvents can also be employed with advantage. The term "dispersion" herein is intended to include both true solutions and emulsions. For example, one method is to dissolve the cellulose derivative (e.g. cellulose ester) in acrylonitrile and/or comonomer up to the limit of its solubility and add the resulting dope to an aqueous emulsion containing the polymerization catalyst, emulsifying agent, etc., or by first heating a mixture of the cellulose derivative and the acrylonitrile to reflux temperature before adding the aqueous solution containing catalyst, emulsifier, additional acrylonitrile if desired, and comonomer. Alternatively, the cellulose derivative and the monomeric mixture can be dispersed in aqueous solution containing the polymerization catalyst, emulsifying agent, etc., and the polymerization effected by heating the resulting emulsion to a temperature of about from 30–100° C., and preferably from 35–70° C. The latter method is the preferred procedure.

While ordinary atmospheric pressures are preferred, the reactions can also be carried out at pressures substantially above or below normal atmospheric pressures. Advantageously, an activating agent such as an alkali metal bisulfite or metabisulfite, e.g. sodium or potassium bisulfite, can be used in conjunction with the polymeriaztion catalyst in approximately equal amount. The emulsifying agents include compounds such as salts of higher fatty acids, e.g. sodium or potassium stearate, palmitate, etc., ordinary soaps, salts of higher fatty alcohol sulfates, e.g. sodium or potassium lauryl sulfate, sodium or potassium stearyl sulfate, etc., salts of aromatic sulfonic acids such as alkylnaphthalene sulfonic acid, and the like. For bead or granular polymeriaztions relatively poor dispersing agents such as starch, methylated starch, gum arabic, polyvinyl alcohol, partially hydrolyzed polyvinyl acetate, etc. Chain regulators such as hexyl, octyl, dodecyl, myristyl mercaptans, etc., which impart improved solubility to the resulting graft copolymers, can be used in the above processes. Stirring, shaking or tumbling of the reaction mixtures facilitates the polymerizations and produce more uniform products. Separation of the products can be accomplished by conventional methods of polymer separation from reaction mixtures, for example, by filtration, by precipitation followed by filtration, etc. The resulting graft copolymers have been found to contain approximately the same proportion of constituents as were present in the starting polymerization mixtures.

The following examples will serve to illustrate further the manner in which we practice our invention.

*Example 1*

Ten g. of Aerosol OT (dioctyl sodium sulfosuccinate) and 350 ml. of water were placed in a 1-liter, 3-necked flask equipped with a reflux condenser, stirrer, and thermometer. The whole was stirred until an emulsion had formed, and 20 ml. of a 3% solution of potassium persulfate, 0.5 g. t-dodecylmercaptan, 30 g. of distilled vinyl 2,2-dimethylbutyrate, 20 g. cellulose acetate (38% acetyl), and 50 g. distilled acrylonitrile were added. The flask was deareated with nitrogen, and the emulsion was stirred at 23° C. for 10 minutes. It was then maintained at 40–60° C. for 2 hours. After breaking the emulsion with aqueous sodium chloride, the polymer was collected on a filter, washed and dried. The yield was over 90% of theoretical value of graft copolymer containing approximately 50% by weight of combined acrylonitrile. A 15% solution of the polymer in dimethylformamide was prepared and then spun into monofilament fibers. The fibers tested at 3.9 g. per denier and had 20% elongation at break. They were found to be readily dyeable to be highly resistant to boiling water; no degradation thereof was observed.

*Example 2*

The experiment in Example 1 was repeated except that 20 g. of N-2,2-dimethylbutyl acrylamide was substituted for the 30 g. of vinyl 2,2-dimethylbutyrate. The fibers tested at 3,6 g. per denier and had a 17% elongation at break. These fibers also showed good dyeability and very good hydrolytic stability, as well as greatly improved stability to heat and oxidation.

*Example 3*

Eighty g. of acrylonitrile, 5 g. of di-2,2-dimethylbutyl maleate, 15 g. of cellulose acetate (35% acetyl), 350 ml.

of water, 10 g. of Aerosol OT (dioctyl sodium sulfosuccinate), 20 ml. of 3% solution of potassium persulfate, and 0.5 g. of t-dodecylmercaptan were added to a flask, and the flask deareated with nitrogen. The resulting emulsion was heated at 65° C. for 3 hours and then broken with aqueous sodium chloride. The polymer was washed and dried as before. The yield was 95–100% of theoretical of graft copolymer having approximately the starting proportions of the constituents combined therein. Fibers extruded from a 17% solution in dimethylformamide tested at a tenacity of 3.5 g. per denier and had an elongation of 24%. The fibers showed good dyeability and very high resistance to thermal, oxidative and hydrolytic degradation.

Similarly high stability results are obtained in accordance with the processes of the preceding examples using any of the other cellulose esters, ethers or ester-ethers as described herein as well as when using any of the ethenoid comonomers as described herein within the relative ranges of proportions embodying the invention. Thus, any of the mentioned comonomers can be substituted for the specified 2,2-dimethylalkyl group containing compound in the above examples to give generally similar high stability graft copolymers, for example, vinyl 2,2-dimethylpropionate, vinyl 2,2-dimethylhexanoate, 2,2-dimethylpropyl acrylate, 2,2-dimethylbutyl acrylate, etc. can be substituted in Example 1 to give the corresponding species of graft copolymers, while N-2,2-dimethypropyl acrylamide, N-2,2-dimethylbutyl methacrylamide, etc. can be substituted in the process of Example 2 to give the corresponding graft copolymers. Similar high stability graft copolymers are also obtained by substituting in Example 3 other of the mentioned di-2,2-dimethylalkyl maleates and fumarates such as di-2,2-dimethylbutyl fumarate.

The graft copolymers of the invention as above described are readily soluble in polyacrylonitrile solvents such as dimethylformamide, N,N-dimethylacetamide, ethylene carbonate, N-methyl-2-pyrrolidone, gamma-butyrolactone, dimethyl sulfoxide, etc., with or without added fillers, pigments, dyes, plasticizers, etc., as desired, and the dopes thus obtained can be spun to strong, lustrous and very stable fibers by conventional wet or dry spinning processes, or the dopes can be coated to sheet materials that are flexible, tough and of outstanding thermal and hydrolytic stability and useful as wrapping materials, photographic film supports, and the like. The polymers can also be readily extruded into sheet materials, or used to prepare molding compositions for compression, extrusion or injection molding of shaped articles. Further, they are compatible with various other acrylonitrile polymers forming intimate blends therewith, for example, with polyacrylonitrile.

Although the preparation of the graft copolymers of the invention has been illustrated with batch type procedures, it will be apparent that the copolymerizations can also be carried out in a continuous fashion, for example, the reactants as well as the catalysts and other polymerization aides can be continuously added to the polymerization system with continuous or semi-continuous removal of polymer as it is formed. By suitable choice of conditions, the use of reactants and the withdrawal of polymer can be correlated to give substantially complete polymerization in continued fashion.

The invention has been described in detail with particular reference to certain preferred embodiments thereof, but it will be understood that variations and modifications can be effected within the spirit and scope of the invention as described hereinabove and as defined in the appended claims.

What we claim is:
1. A resinous graft copolymer of (1) from 50–95% by weight of monomeric material consisting of from 75–98% by weight of acrylonitrile and from 25–2% by weight of at least one other ethenoid comonomer selected from the group consisting of vinyl and isopropenyl esters of 2,2-dimethylalkanoic acids of from 5–16 carbon atoms, 2,2-dimethylalkyl acrylates and methacrylates, di-2,2-dimethylalkyl maleates, fumarates, itaconates, citraconates, N-2,2-dimethylalkyl acrylamides and methacrylamides, di-N-2,2-dimethylalkyl maleamides, fumaramides, itaconamides and citraconamides, 2,2-dimethylalkyl vinyl ethers and 2,2-dimethylalkyl vinyl ethers, wherein in each instance the said 2,2-dimethylalkyl group contains from 5–10 carbon atoms, and (2) from 50–5% by weight of a compound composed of cellulose having from 10–70% of the hydroxyl groups of the cellulose in free form and having the hydrogen of the remainder of the hydroxyl groups replaced by radicals from the group consisting of alkyl groups of from 1–4 carbon atoms, carboxyalkyl groups of from 2–5 carbon atoms and saturated aliphatic acyl groups of from 2–5 carbon atoms.

2. A resinous graft copolymer of (1) from 70–90% by weight of monomeric material consisting of from 75–98% by weight of acrylonitrile and from 25–2% by weight of a compound selected from the group consisting of vinyl and isopropenyl esters of 2,2-dimethylalkanoic acids of from 5–16 carbon atoms, 2,2-dimethylalkyl acrylates and methacrylates, di-2,2-dimethylalkyl maleates, fumarates, itaconates, citraconates, N-2,2-dimethylalkyl acrylamides and methacrylamides, di-N-2,2-dimethylalkyl maleamides, fumaramides, itaconamides and citroconamides, 2,2-dimethylalkyl vinyl ethers and 2,2-dimethylalkyl vinyl ethers, wherein in each instance the said 2,2-dimethylalkyl group contains from 5–16 carbon atoms, and (2) from 30–10% by weight of a cellulose acyl ester wherein the said acyl group contains from 2–5 carbon atoms and wherein from 20–50% of the hydroxyl groups of the cellulose are in free form.

3. A resinous graft copolymer of (1) from 70–90% by weight of monomeric material consisting of from 75–98% by weight of acrylonitrile and from 25–2% by weight of vinyl 2,2-dimethylbutyrate, and (2) from 30–10% by weight of cellulose acetate wherein from 20–50% of the hydroxyl groups of the cellulose are in free form.

4. A resinous graft copolymer of (1) from 70–90% by weight of monomeric material consisting of from 75–98% by weight of acrylonitrile and from 25–2% by weight of N-2,2-dimethylbutyl acrylamide, and (2) from 30–10% by weight of cellulose acetate wherein from 20–50% of the hydroxyl groups of the cellulose are in free form.

5. A resinous graft copolymer of (1) from 70–90% by weight of monomeric material consisting of from 75–98% by weight of acrylonitrile and from 25–2% by weight of di-2,2-dimethylbutyl maleate, and (2) from 30–10% by weight of cellulose acetate wherein from 20–50% of the hydroxyl groups of the cellulose are in free form.

6. A resinous graft copolymer of (1) from 70–90% by weight of monomeric material consisting of from 75–98% by weight of acrylonitrile and from 25–2% by weight of 2,2-dimethylbutyl acrylate and (2) from 30–10% by weight of cellulose acetate wherein from 20–50% of the hydroxyl groups of the cellulose are in free form.

7. A resinous graft copolymer of (1) from 70–90% by weight of monomeric material consisting of from 75–98% by weight of acrylonitrile and from 25–2% by weight of N-2,2-dimethylbutyl methacrylamide and (2) from 30–10% by weight of cellulose acetate wherein from 20–50% of the hydroxyl groups of the cellulose are in free form.

8. A process for preparing a resinous graft copolymer which comprises graft copolymerizing a mixture of (1) from 75–98% by weight of acrylonitrile and from 25–2% by weight of at least one other ethenoid comonomer selected from the group consisting of vinyl and isopropenyl esters of 2,2-dimethylalkanoic acids of from 5–16 carbon atoms, 2,2-dimethylalkyl acrylates and methacrylates, di-2,2-dimethylalkyl maleates, fumarates, itaconates, citraconates, N-2,2-dimethylalkyl acrylamides and methacrylamides, di-N-2,2-dimethylalkyl maleamides, fumaramides, itaconamides and citraconamides, 2,2-dimethylalkyl vinyl ethers and 2,2-dimethylalkyl vinyl ethers, wherein in each instance the said 2,2-dimethylalkyl group contains from 5–16 carbon atoms, said graft copolymerizing being effected by heating said mixture of said monomeric material and (2) a cellulose derivative having free hydroxyl groups in the presence of a polymerization catalyst.

References Cited by the Examiner

UNITED STATES PATENTS 2,865,872　12/1958　Hagemeyer et al. _____ 260—17

WILLIAM H. SHORT, *Primary Examiner.*

LOUISE P. QUAST, SAMUEL H. BLECH, *Examiners.*

J. NORRIS, *Assistant Examiner.*